United States Patent
Lin et al.

(10) Patent No.: US 9,822,889 B2
(45) Date of Patent: Nov. 21, 2017

(54) FLOW LIMITING DEVICE WITH A BACK FLOW PREVENTION

(71) Applicant: FUJIAN XIHE SANITARY WARE TECHNOLOGY CO., LTD., Nan'an, Fujian (CN)

(72) Inventors: Xiaofa Lin, Nan'an (CN); Xiaoshan Lin, Nan'an (CN); Qiqiao Liu, Nan'an (CN); Xiaoqing Deng, Nan'an (CN); Qun Yu, Nan'an (CN)

(73) Assignee: FUJIAN XIHE SANITARY WARE TECHNOLOGY CO., LTD., Nan'An (CN)

( * ) Notice: Subject to any disclaimer, the term of this patent is extended or adjusted under 35 U.S.C. 154(b) by 0 days.

(21) Appl. No.: 14/955,993

(22) Filed: Dec. 1, 2015

(65) Prior Publication Data

US 2017/0009899 A1    Jan. 12, 2017

(30) Foreign Application Priority Data

Jul. 6, 2015   (CN) .................... 2015 2 0479310 U (51) Int. Cl.
 *F16K 15/14*   (2006.01)
(52) U.S. Cl.
 CPC .......... *F16K 15/148* (2013.01); *F16K 15/142* (2013.01); *Y10T 137/789* (2015.04); *Y10T 137/7842* (2015.04); *Y10T 137/7879* (2015.04); *Y10T 137/7896* (2015.04); *Y10T 137/88054* (2015.04)
(58) Field of Classification Search
 CPC ..... F16K 7/00; F16K 7/12; F16K 7/14; F16K 7/17; F16K 15/00; F16K 15/14; F16K 15/141; F16K 15/142; F16K 15/148; Y10T 137/7837; Y10T 137/7838; Y10T 137/7842; Y10T 137/7847; Y10T 137/7848; Y10T 137/7879;
(Continued)

(56) References Cited

U.S. PATENT DOCUMENTS

| 4,000,857 A * | 1/1977 | Moen .................... B05B 1/3006 137/860 |
| 5,743,291 A * | 4/1998 | Nehm ....................... E03C 1/08 137/454.2 |
| 6,695,011 B2 * | 2/2004 | Sochtig .................. G05D 7/012 137/516.15 |

FOREIGN PATENT DOCUMENTS

| CN | 201420884 Y | 3/2010 |
| DE | 10043079 A1 * | 3/2002 ........... F16K 15/148 |

* cited by examiner

*Primary Examiner* — Marina Tietjen
*Assistant Examiner* — Hailey K Do
(74) *Attorney, Agent, or Firm* — Rabin & Berdo, P.C.

(57) ABSTRACT

A flow limiting device with a back flow prevention mechanism includes a body that has an isolation board and a water-through cavity. The isolation board has a water-through hole connecting to the water-through cavity and a flow limiting device having a flow limiting component and stop ribs which limit the position change of the flow limiting component. The stop ribs are arranged on the inner wall of the water-through cavity at equal intervals. The flow limiting component is set in the water-through cavity. The outer side of the flow limiting component is contacted on the stop ribs. A back flow prevention mechanism comprises, a back flow prevention component which is fixed in the water-through hole and a supporting structure which is set for supporting the back flow prevention component when it expands on the inner wall of the water-through cavity.

3 Claims, 6 Drawing Sheets

(58) Field of Classification Search
CPC ........... Y10T 137/7887; Y10T 137/789; Y10T 137/7896; Y10T 137/87917; Y10T 137/88054
USPC ....... 137/511, 512, 512.3, 513.3, 513.5, 846, 137/851, 854, 860, 613, 614.2
See application file for complete search history.

FLOW LIMITING DEVICE WITH A BACK FLOW PREVENTION

FIELD OF THE INVENTION

The present invention relates to sanitary ware, especially to a flow limiting device with a back flow prevention mechanism.

BACKGROUND OF THE INVENTION

With the development of industry of sanitary ware, the flow limiting device is widely used in the water outlet device because the flow limiting device could limit the instant over flow on starting time and also could be applied for saving water and reducing impact of water; but present flow limiting device is without limit mechanism or back flow prevention structure, so that during using process when back flow happening it would push against the flow limiting device and make the flow limiting device fall off or deform then lead to low effect of flow limiting as well as less service life cause easily broken for the device; Therefore, certain type of flow limiting device with back flow prevention structure is needy for market requirement.

SUMMARY OF THE INVENTION

The object of the present invention is to offer a flow limiting device with a back flow prevention mechanism, it is easily to realize with simple structure, the residual water is prevented to reversely push against the flow limiting by the back flow prevention structure to prohibit deviatedly waggling of the flow limiting component in the water-through cavity effectively, and to enhance the stability of the flow limiting component to realize balanced limiting effect.

One technical solution to the above technical problems for the present invention is that:

A flow limiting device with a back flow prevention mechanism, it comprises a body, in which is disposed with an isolation board and a water-through cavity; said isolation board is provided with a water-through hole connecting to the water-through cavity, it also comprises:

A flow limiting device comprises a flow limiting component and stop ribs which are set for limiting the position change of the flow limiting component; said stop ribs are arranged on the inner wall of the water-through cavity at equal interval, the flow limiting component is set in the water-through cavity, the outer side of the flow limiting component is contacted on said stop ribs;

A back flow prevention mechanism comprises a back flow prevention component which is fixed in the water-through hole; moreover, also comprises a supporting structure which is set for supporting the back flow prevention component when it expanding on the inner wall of the water-through cavity.

In another preferred embodiment, said back flow prevention component comprises a connection part and a deformation part, said connection part is provided for connection cooperation with said supporting structure, said deformation part is formed by circumferential extension of the connection part.

In another preferred embodiment, the body comprises a shell and a cover body which allows water go through, the shell is disposed with said isolation board, the cover body covers on the shell.

In another preferred embodiment, the place enclosed by said shell with isolation board and the said cover body is formed said water-through cavity, said supporting structure includes a supporting shore, a connecting sleeve and a connection shaft; said supporting shore is formed by the extension of center section of said isolation board towards the direction of the cover body, the connection shaft is formed by the extension of center inner surface of the cover body towards the direction of the isolation board; said connection part is set in hollow and is coupled out of the connection shaft; one end of the connecting sleeve is connected with the supporting shore while the other end is connected with the connection shaft.

In another preferred embodiment, the place enclosed by said shell with isolation board and the said cover body is formed said water-through cavity, said supporting structure includes a connection plate, a supporting shore and a connection sleeve, the connection plate is disposed with an inlet through hole, center of one side of the connecting plate is disposed with coupling holes while the other side is extended with a shaft body towards said cover body, the supporting shore is formed by the extension of center section of said isolation board towards the direction of the cover body and is inserted into the coupling hole of the connecting plate; the connection sleeve is formed by the extension of the inner center surface of the cover body; said connection part is set in hollow and is coupled out of the connection sleeve, the shaft body of the connecting plate is partially or wholly coupled in the connection sleeve.

In another preferred embodiment, said supporting structure comprises a supporting shore and a stop pillar, the supporting shore is formed by the extension of center section of said isolation board towards the direction of the cover body, said connection part is set in hollow and is coupled out of the supporting shore, the stop pillar is formed by the extension of the inner center surface of the cover body, the radial size of said stop pillar is larger than inner diameter of said connection part, the free end of said stop pillar is near or contacted to the free end of the supporting shore.

In another preferred embodiment, the shaft body of said connecting plate comprises an inner shaft portion and an outer shaft portion which is placed on the end of the inner shaft portion, the radial size of the inner shaft portion is larger than inner diameter of said connection part, the outer shaft portion is axially divided into two portions by a center cut groove while the two portions are pressedly coupled into said connection sleeve.

In another preferred embodiment, said water-through cavity comprises a first water-through cavity and a second water-through cavity, the first water-through cavity and the second water-through cavity are isolated by said isolation board, said stop ribs are disposed on the inner wall of the first water-through cavity, said flow limiting component is set in the first water-through cavity; the place enclosed by said cover body and said shell is formed said second water-through cavity, said back flow prevention component is placed in the second water-through cavity.

In another preferred embodiment, said back flow prevention component is a V shape sealing ring.

In another preferred embodiment, said flow limiting component is an annular elastomer, said isolation board is disposed with an annular connection socket to accommodate the flow limiting component, said stop ribs are extended to the outer wall of the connection socket, the groove surface of the connection socket is disposed with said water-through hole.

Comparing to the existing known technology, the technical solution of the present invention has advantages as follows:

1. Present invention is provided with a flow limiting device with a back flow prevention mechanism, it is easily to realize with simple structure, when water flow stopping the residual water is prevented from reversely pushing against the flow limiting component by the back flow prevention structure to effectively prohibit deviatedly waggling of the flow limiting component in the water-through cavity, and to enhance the stability of the flow limiting component to realize balanced flow limiting effect;

2. Said supporting structure of present invention is not only used to support the back flow prevention mechanism but also to limit radial deviation of the flow limiting component, as to make the flow limitting effect better and to prevent the service life of the flow limiting componect to be reduced due to over deformation.

DETAILED DESCRIPTION OF THE EMBODIMENTS

The present invention will be further described with the drawings and the embodiments to make the present invention more clear and well-known. It should be noted that, the embodiments are described to explain present invention but not to limit present invention.

Please referring to FIGS. 1~4, a flow limiting device with a back flow prevention mechanism of present invention, it comprise a body, in which is disposed with an isolation board 10 and a water-through cavity 11. Specifically, the body comprises a shell 1 and a cover body 2 which allows water go through; said shell 1 is disposed with the isolation board 10 inside, the place enclosed by the shell 1 with the isolation board 10 and the cover body 2 is formed water-through cavity 11; said isolation board 10 is provided with a water-through hole 12 connecting to the water-through cavity 11. Present invention also comprises:

A flow limiting device 3 comprises a flow limiting component 31 and stop ribs 110 which are set for limiting the position change of the flow limiting component 31; said stop ribs 110 are arranged on the inner wall of the water-through cavity 11 at equal interval, the flow limiting component 31 is set in the water-through cavity 11, the outer side of the flow limiting component 31 is contacted on said stop ribs 110; Specifically, said flow limiting component 31 is an annular elastomer, said isolation board 10 is disposed with an annular connection socket 101 to accommodate the flow limiting component 31, said stop ribs 110 are extended to the outer wall of the connection socket 101, the groove surface of the connection socket 101 is disposed with said water-through hole 12.

A back flow prevention mechanism 4 comprises a back flow prevention component 40 which is fixed in the water-through hole 11; said back flow prevention component 41 comprises a connection part 40A and a deformation part 40B, said connection part 40A is provided for connection cooperation with said supporting structure 5, said deformation part 40B is formed by circumferential extension of the connection part 40A; said connection part 40A is set in hollow, detailedly, said back flow prevention component 41 is a V shape sealing ring.

Moreover, also comprises a supporting structure 5 which is set for supporting the back flow prevention component 40 when it is exploded on the inner wall of the water-through cavity 11.

Figure 1:
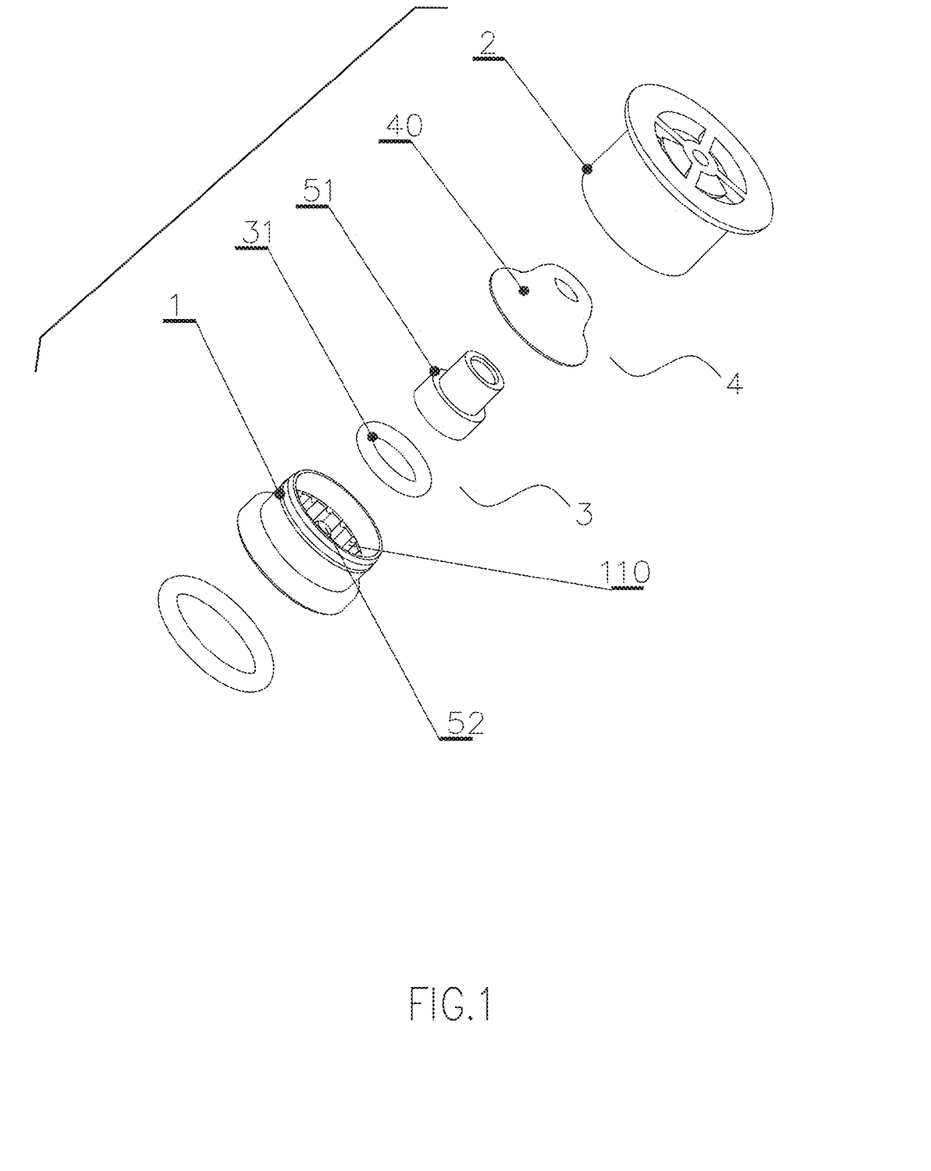
FIG. 1 illustrates an exploded diagram of the flow limiting device of the present invention according to embodiment 1.
Figure 2:
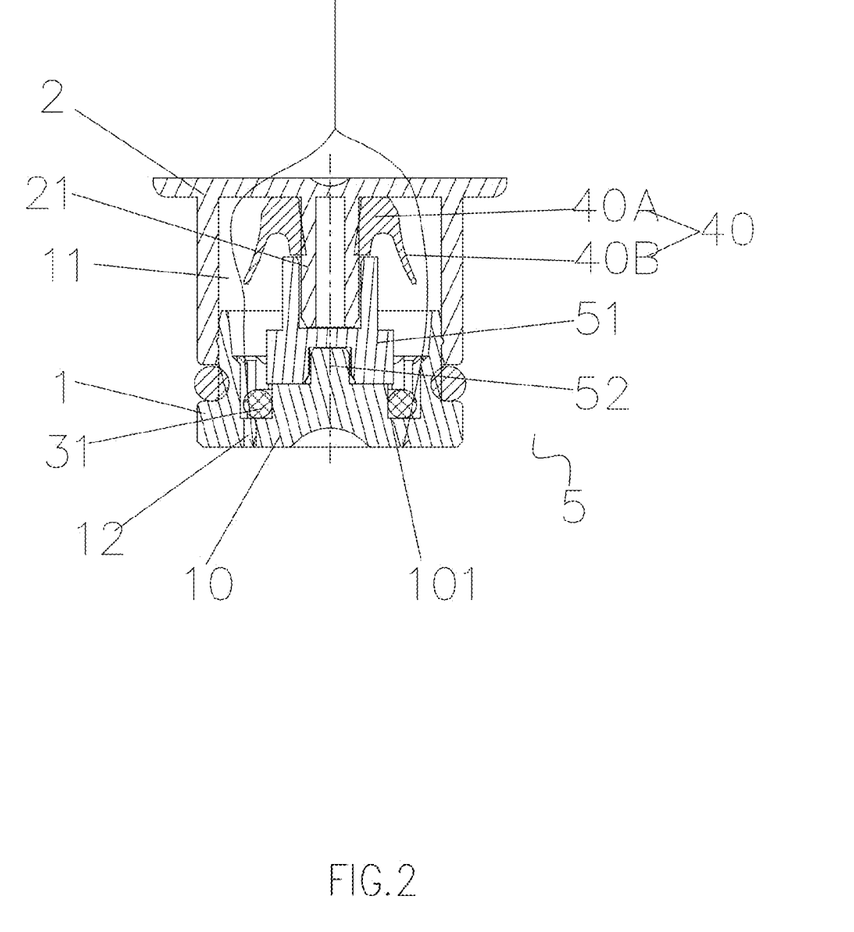
FIG. 2 illustrates a sectional view of the flow limiting device of the present invention according to embodiment 1.

Embodiment 1, please referring to FIGS. 1~2, a flow limiting device with a back flow prevention mechanism of present invention, it mainly comprises said components: shell 1, cover body 2, flow limiting component 31 and back flow prevention component 40;

Said supporting structure 5 includes a supporting shore 52, a connecting sleeve 51 and a connection shaft 21; said supporting shore 52 is formed by the extension of center section of said isolation board 10 towards the direction of the cover body 2, the connection shaft 21 is formed by the extension of center inner surface of the cover body 2 towards the direction of the isolation board 10; said connection part 40A is disposed out of the connection shaft; one end of the connecting sleeve 51 is connected with the supporting shore 52 while the other end is connected with the connection shaft 21, also the other end surface of the connecting sleeve 51 is near the connection part 40A to limit the bottom end position of said back flow prevention component 40.

During actual assembly process, firstly, make the flow limiting component 31 cooperate with the support shore 52 in the shell 1 then fix it into the connection socket 101 of the isolation board 10; secondly, make the back flow prevention component 40 couple out of the connection shaft 21 of the cover body 2; thirdly, make one end of the connecting sleeve 51 be connected with the supporting shore 52 while the other end is connected with the connection shaft 21; finally, assembly the shell 1 and the cover body 2 together to finish the whole assembly process.

When using, install the whole device into the water outlet device, as water flows in, the deformation part 40B of the back flow prevention component 40 would make deformation downwardly under the impact of water, then water goes through the water-through cavity 11 and goes into the water-through hole at the bottom of the flow limiting component 31. In original status, the flow limiting component 31 is without deformation, as water flow increasing, the flow limiting component 31 is expanded outwardly by up flow pushing then gradually blocks the water-through hole 12 to accomplish the flow limiting function by reducing water passing through area; when expanding to the position of the stop ribs 110, the flow limiting component 31 will be protected and prevented from over-expanding by the stop ribs 110, meanwhile, water flow could still go in through the gap between the stop ribs 110 and the flow limiting component 31 to accomplish certain effect of decompression; When stopping, the water flow will reversely push against the deformation part 40B of the back flow prevention component 40 to make the deformation part 40B of the back flow prevention component 40 expand on the inner wall of the water-through cavity 11 by its own elasticity for preventing back flow.

Figure 3:
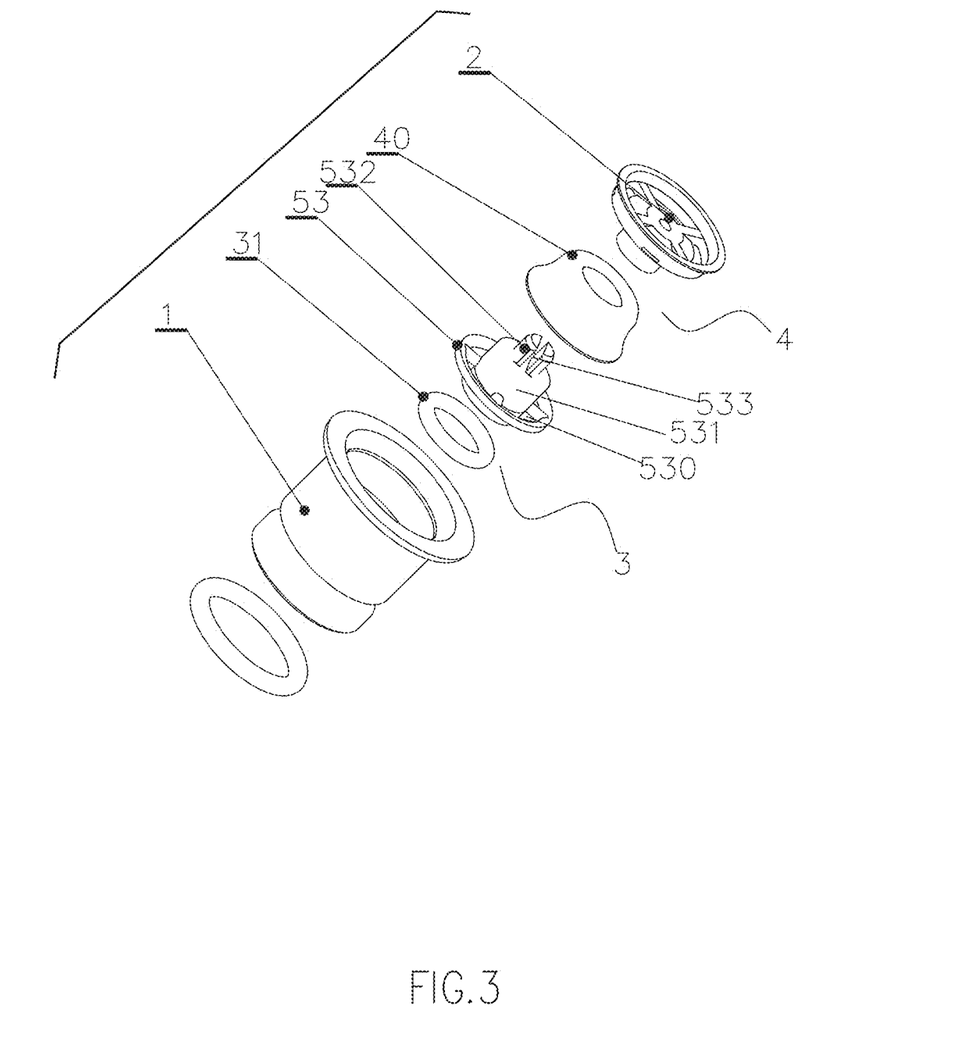
FIG. 3 illustrates an exploded diagram of the flow limiting device of the present invention according to embodiment 2.
Figure 4:
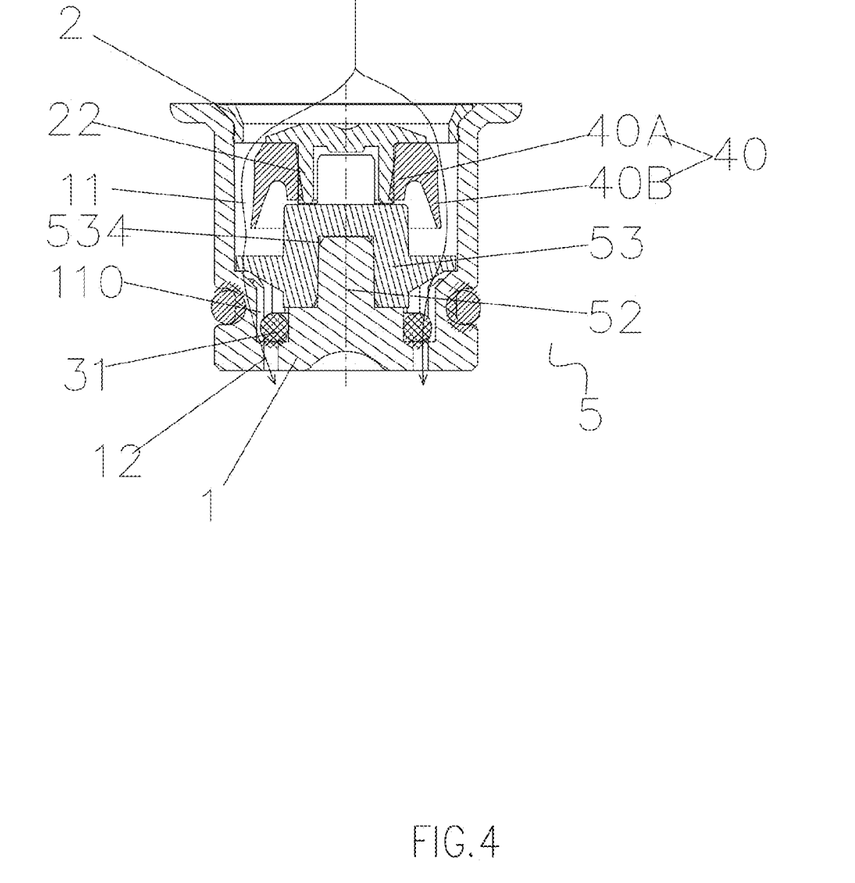
FIG. 4 illustrates a sectional view of the flow limiting device of the present invention according to embodiment 2.

Embodiment 2, please referring to FIGS. 3~4, the same content of the flow limiting device with a back flow prevention mechanism of present invention with embodiment 1 is no longer described here, the difference is shown as following:

Said supporting structure 5 includes a connection plate 53, a supporting shore 52 and a connection sleeve 22, the connection plate 53 is disposed with an inlet through hole 530, center of one side of the connecting plate 53 is disposed with coupling holes 534 while the other side is extended with a shaft body towards said cover body 2, the supporting shore 52 is formed by the extension of center section of said isolation board 10 towards the direction of the cover body 2 and is inserted into the coupling hole 534 of the connecting plate; the connection sleeve 22 is formed by the extension of the inner center surface of the cover body 2; said connection part 40A is set in hollow and is coupled out of the connection sleeve 22, the shaft body of the connecting plate 53 is partially or wholly coupled in the connection sleeve 22. Detailedly, the shaft body of the connecting plate 53 comprises an inner shaft portion 531 and an outer shaft portion 532 which is placed on the end of the inner shaft portion 531, the radial size of the inner shaft portion 531 is larger than inner diameter of said connection part 40A, the outer shaft portion 532 is axially divided into two portions by a center cut groove 533 while the two portions are pressedly coupled into said connection sleeve 22. The outer diameter of the connection plate 53 matches with the radial size of the inner wall of the water-through cavity 11.

When using, install the whole device into the water outlet device, as water flows in, the deformation part 40B of the back flow prevention component 40 would make deformation downwardly under the impact of water, then water goes through the inlet through hole 530 and goes into the flow limiting component 31 then finally goes out of the water-through hole 12 at the bottom of the flow limiting component 31. In orginal status, the flow limiting component 31 is without deformation, as water flow increaing, the flow limiting component 31 is expanded outwardly by up flow pushing then gradually blocks the water-through hole 12 to accomplishe the flow limiting function by reducing water passing through area; when expanding to the position of the stop ribs 110, the flow limiting component 31 will be protected and prevented from over-expanding by the stop ribs 110, meanwhile, water flow could still go in through the gap between the stop ribs 110 and the flow limiting component 31 to accomplish certain effect of decompression; When stoping, the water flow will reversely push against the deformation part 40B of the back flow prevention component 40 to make the deformation part 40B of the back flow prevention component 40 expand on the inner wall of the water-through cavity 11 by its own elasticity for preventing back flow.

Figure 5:
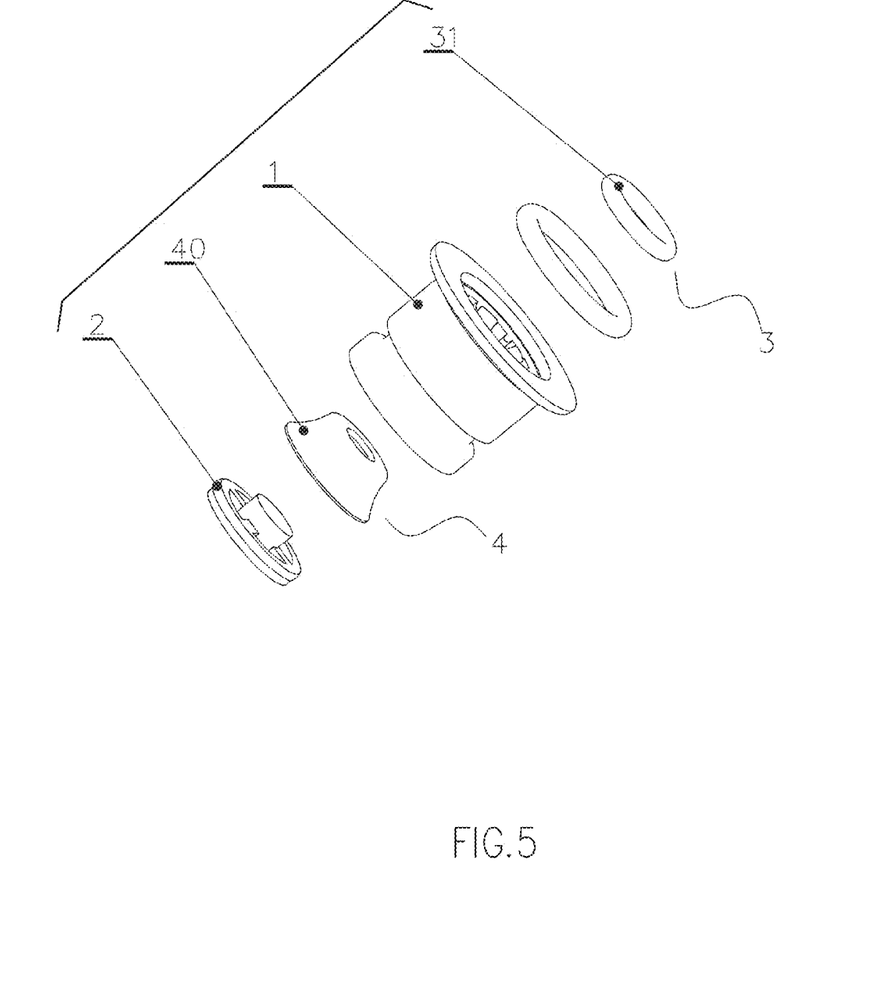
FIG. 5 illustrates an exploded diagram of the flow limiting device of the present invention according to embodiment 3.
Figure 6:
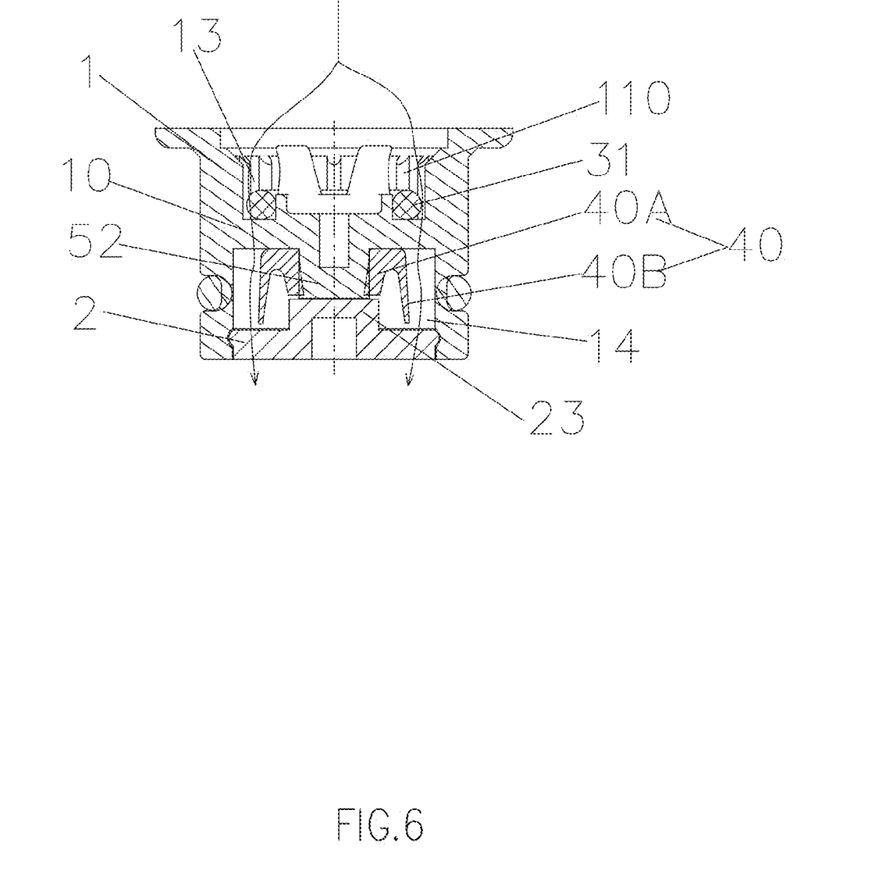
FIG. 6 illustrates a sectional view of the flow limiting device of the present invention according to embodiment 3.

Embodiment 3, please referring to FIGS. 5~6, the same content of the flow limiting device with a back flow prevention mechanism of present invention with embodiment 1 & 2 is no longer described here, the difference is shown as following:

Said supporting structure 5 comprises a supporting shore 52 and a stop pillar 23, the supporting shore 52 is formed by the extension of center section of said isolation board 10 towards the direction of the cover body 2, said connection part 40A is coupled out of the supporting shore 52; the stop pillar 23 is formed by the extension of the inner center surface of the cover body 2, the radial size of the stop pillar 23 is larger than inner diameter of said connection part 40A, the free end of the stop pillar 23 is near or contacted to the free end of the supporting shore 52 to limit the bottom side of the back flow prevention component 40.

Said water-through cavity comprises a first water-through cavity 13 and a second water-through cavity 14, the first water-through cavity 13 and the second water-through cavity 14 are isolated by said isolation board 10, said stop ribs 110 are disposed on the inner wall of the first water-through cavity 13, said flow limiting component 31 is set in the first water-through cavity 13; said cover body 2 is cooperated with the bottom side of the shell 1, the place enclosed by said cover body 2 and said shell 1 is formed said second water-through cavity 14, said back flow prevention component 41 is placed in the second water-through cavity 14.

When using, install the whole device into the water outlet device, water flows into the top end of the shell 1 then goes through the first water-through cavity 13 and goes out of the water-through hole at the bottom of the flow limiting component 31. In orginal status, the flow limiting component 31 is without deformation, as water flow increaing, the flow limiting component 31 is expanded outwardly by up flow pushing then gradually blocks the water-through hole 12 to accomplishe the flow limiting function by reducing water passing through area; when expanding to the position of the stop ribs 110, the flow limiting component 31 will be protected and prevented from over-expanding by the stop ribs 110, meanwhile, water flow could still go in through the gap between the stop ribs 110 and the flow limiting component 31 to accomplish certain effect of decompression; when water goes through the water-through hole at the bottom of the flow limiting component 31 and goes into the second water-through cavity 14, the deformation part 40B of the back flow prevention component 40 would make deformation downwardly under the impact of water before water goes out from the cover body 2. When stoping, the water flow will reversely push against the deformation part 40B of the back flow prevention component 40 to make the deformation part 40B of the back flow prevention component 40 expand on the inner wall of the water-through cavity 11 by its own elasticity for preventing back flow.

Present invention is provided with a flow limiting device with a back flow prevention mechanism, it is easily to realize with simple structure, when water flow stopping the residual water is prevented from reversely pushing against the flow limiting component by the back flow prevention structure to effectively prohibit deviatedly waggling of the flow limiting component in the water-through cavity, and to enhance the stability of the flow limiting component to realize balanced flow limiting effect; the supporting structure of present invention is not only used to support the back flow prevention mechanism but also to limit radial deviation of the flow limiting component, as to make the flow limitting effect better and to prevent the service life of the flow limiting componect to be reduced due to over deformation.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:
1. A flow limiting device comprising:
a body, in which is disposed an isolation board and a water-through cavity, said isolation board being provided with a water-through hole connecting to the water-through cavity, the water-through cavity including:

a flow limiting device comprising a flow limiting component and stop ribs which are set for limiting the position change of the flow limiting component, wherein
  said stop ribs are arranged on an inner wall of the water-through cavity at equal intervals,
  the flow limiting component is set in the water-through cavity, and
  an outer side of the flow limiting component is in contact with said stop ribs;
a back flow prevention mechanism comprising a back flow prevention component which is fixed in the water-through cavity; and
a supporting structure supporting the back flow prevention component when the back flow prevention component is on the inner wall of the water-through cavity,
said back flow prevention component comprising a connection part and a deformation part, said connection part for connection cooperation with said supporting structure,
said deformation part is formed by a circumferential extension of the connection part,
the body comprising a shell and a cover body which allows water to go therethrough,
the shell is disposed with said isolation board,
the cover body covers the shell,
a place enclosed by said shell with said isolation board and the cover body is formed in said water-through cavity,
said supporting structure includes a supporting shore, a connecting sleeve and a connection shaft,
said supporting shore is formed by an extension of center of a section of said isolation board in a direction toward the cover body,
the connection shaft is formed by an extension of a center inner surface of the cover body in a direction toward the isolation board,
said connection part is set in a hollow and is coupled to an exterior of the connection shaft, and
one end of the connecting sleeve is connected with the supporting shore while another end of the connecting sleeve is connected with the connection shaft.

2. The flow limiting device according to claim 1, wherein said back flow prevention component is a sealing ring with a V-shaped cross section.

3. The flow limiting device according to claim 1, wherein
said flow limiting component is an annular elastomer,
said isolation board is disposed with an annular connection socket to accommodate the flow limiting component,
said stop ribs are extended to an outer wall of the connection socket, and
a groove surface of the connection socket is disposed with said water-through hole.

\* \* \* \* \*